(12) United States Patent
Sasaki et al.

(10) Patent No.: US 7,575,426 B2
(45) Date of Patent: Aug. 18, 2009

(54) CLAMPING DEVICE AND INJECTION MOLDING MACHINE PROVIDED WITH CLAMPING DEVICE

(75) Inventors: Noriyuki Sasaki, Numazu (JP); Jun Koike, Sunto-gun (JP); Takaki Miyauchi, Numazu (JP)

(73) Assignee: Toshiba Kikai Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/964,379

(22) Filed: Dec. 26, 2007

(65) Prior Publication Data

US 2008/0160131 A1 Jul. 3, 2008

(30) Foreign Application Priority Data

Dec. 27, 2006 (JP) ............................. 2006-353444

(51) Int. Cl.
  *B29C 45/64* (2006.01)
(52) U.S. Cl. ........................ 425/135; 425/169; 425/190; 425/451.9; 425/595
(58) Field of Classification Search ................. 425/135, 425/169, 190, 595, 451.9
  See application file for complete search history.

(56) References Cited

U.S. PATENT DOCUMENTS 5,776,402 A * 7/1998 Glaesener ................... 425/589

FOREIGN PATENT DOCUMENTS

| DE | 30 38 274 | * | 5/1982 |
| DE | 102 14 458 | * | 10/2003 |
| JP | 08-258103 | * | 10/1996 |
| JP | 11-170322 | | 6/1999 |
| JP | 2001-1381 | | 1/2001 |

OTHER PUBLICATIONS

English language abstract of JP 11-170322, published Jun. 29, 2007.
English language abstract of JP 2001-1381, published Jan. 9, 2001.
English Machine translation of DE10214458 published Oct. 16, 2003.

* cited by examiner

*Primary Examiner*—James Mackey
(74) *Attorney, Agent, or Firm*—DLA Piper LLP US

(57) ABSTRACT

A stationary platen unit and a movable platen unit each include a platen body, a load transmission portion, a die fixing plate, and a backup member. The backup member is located between the platen body and the die fixing plate. The backup member is movable between a first position in which it is in contact with both the die fixing plate and the platen body and a second position in which it is separate from the die fixing plate and/or the platen body. When a large die set is attached to the die fixing plate, the backup member is situated in the first position. When a small die set is attached to the die fixing plate, the backup member is moved to the second position.

13 Claims, 9 Drawing Sheets

CLAMPING DEVICE AND INJECTION MOLDING MACHINE PROVIDED WITH CLAMPING DEVICE

CROSS-REFERENCE TO RELATED APPLICATIONS

This application is based upon and claims the benefit of priority from prior Japanese Patent Application No. 2006-353444, filed Dec. 27, 2006, the entire contents of which are incorporated herein by reference.

BACKGROUND OF THE INVENTION

1. Field of the Invention

The present invention relates to a clamping device for clamping a die set during injection molding operation and an injection molding machine provided with the clamping device.

2. Description of the Related Art

A clamping device of an injection molding machine includes a stationary platen to which a stationary die is attached, a movable platen to which a movable die is attached, a pressure mechanism that generates a clamping force, etc. There are clamping devices of various types. For example, a toggle-type clamping device is described in Jpn. Pat. Appln. KOKAI Publication No. 11-170322, and a composite clamping device in Jpn. Pat. Appln. KOKAI Publication No. 2001-1381. These clamping devices each include four tie bars that are arranged at the respective outer peripheral portions of the stationary and movable platens.

The tie bars are located individually at the four corners of each of the stationary and movable platens. The clamping force is transmitted mainly from a central part of each platen to the die set. Depending on the stiffness of the stationary and movable platens, therefore, the outer peripheral portions of these platens may possibly be deformed. As in the clamping device shown in FIG. 9, for example, the respective outer peripheral portions of a stationary platen 1 and a movable platen 2 are deformed toward each other by a tension that acts on tie bars 3.

A stationary die 4 and a movable die 5 are attached to the stationary platen 1 and the movable platen 2, respectively. The stationary and movable dies 4 and 5 constitute a die set 6. If the platens 1 and 2 are deformed, therefore, a force indicated by arrow P1 in FIG. 9 acts on the stationary and movable dies 4 and 5. The force indicated by arrow P1 causes a leakage of a material such as a resin injected into the die set 6 through parting surfaces 7 of the die set. The smaller the die dimensions, the more noticeable this trend is.

Deformation of the die set can be prevented by increasing the stiffness of the platens. In order to increase the stiffness of the platens, however, their strength should inevitably be enhanced by increasing their thicknesses. In this case, there is a problem that the clamping device is increased in size or weight.

In the clamping device described in Jpn. Pat. Appln. KOKAI Publication No. 2001-1381, convex load transmission portions are formed on the die side of platens in order to prevent deformation of a die set. Die fixing plates for use as intermediate members are arranged individually between the die set and the load transmission portions. In one such conventional clamping device, as shown in FIG. 10, a clamping force may possibly be transmitted mainly from a central part of each of platens 1 and 2 to a die set 6 during clamping operation. This clamping force causes die fixing plates 8a and 8b to push the die set 6 in the direction of arrow P2 in FIG. 10. Thus, deflection of the platens 1 and 2 can be prevented from being transmitted to the die set 6, so that parting surfaces 7 can be prevented from being separated from each other.

In the conventional clamping device shown in FIG. 11, the die fixing plates are arranged individually between a die set and platens. If the die dimensions are larger than the dimensions of pressure surfaces of load transmission portions, therefore, a clamping force acts mainly on a central part of a die set 6. Accordingly, the die fixing plates are deformed so that parting surfaces 7 at the outer peripheral portion of the die set 6 easily open. Thus, if a cavity is formed near the outer peripheral portion of the die set 6, a material that is fed into the cavity may possibly leak through the parting surfaces 7.

BRIEF SUMMARY OF THE INVENTION

The object of the present invention is to provide a clamping device and an injection molding machine in which parting surfaces of a die set can be restrained from being separated from each other during clamping operation so that a material fed into the die set can be prevented from leaking through the parting surfaces.

The present invention is a clamping device for clamping a die set which includes a stationary die, a movable die, and parting surfaces formed between the dies. The clamping device comprises a stationary platen unit to which the stationary die is attached, a movable platen unit to which the movable die is attached, a plurality of tie bars stretched between the stationary platen unit and the movable platen unit and arranged parallel to one another at respective outer peripheral portions of the platen units, and a pressure mechanism which presses the stationary platen unit and the movable platen unit toward each other. At least one of the stationary and movable platen units includes a platen body configured to be pressed by the pressure mechanism, a load transmission portion having a pressure surface projecting toward the die set from a central part of that region of the platen body which is surrounded by the tie bars, a die fixing plate located on the pressure surface and having a die fixing surface wider than the load transmission portion, a space portion formed around the load transmission portion and between the platen body and the die fixing plate, and a backup member disposed in the space portion between the platen body and the die fixing plate. The backup member is configured to move between a first position in which the backup member is in contact with both the platen body and the die fixing plate and a second position in which the backup member is separate from the platen body and/or the die fixing plate. Further, the backup member is adapted to be situated in the first position when the die set attached to the die fixing plate is a large die set with the parting surfaces wider than the pressure surface or to be moved to the second position when a small die set smaller than the large die set is attached to the die fixing plate.

According to this arrangement, the parting surfaces can be restrained from being separated by a clamping force without regard to the type of the die set, large or small. Thus, a material such as a resin that is fed into the die set can be prevented from leaking through the parting surfaces. Further, burrs can be prevented from being formed on products. The present invention can prevent formation of burrs without increasing the thicknesses of the platens. Thus, the clamping device can be reduced in weight and improved in compactness.

According to an aspect of the invention, the clamping device comprises an actuator for loading and unloading the backup member through the side of the platen body. Based on this arrangement, the clamping device may be provided with a controller which controls the actuator to move the backup member between the first position and the second position. Further, the clamping device may be provided with a sensor for determining whether the die set attached to the die fixing plate is the large die set or the small die set.

According to another aspect of the invention, the backup member is a wedge-shaped backup member movable parallel to the die fixing surface, and the clamping device comprises an actuator for moving the backup member parallel to the die fixing surface.

According to a further aspect of the invention, the backup member is movable at right angles to the die fixing surface, and the clamping device comprises an actuator for moving the backup member at right angles to the die fixing surface. Based on this arrangement, the backup member and the actuator may be disposed for movement parallel to the die fixing surface. Further, the clamping device may be provided with a moving mechanism for moving the backup member and the actuator parallel to the die fixing surface.

According to the present invention, moreover, there is provided an injection molding machine, which comprises the above-described clamping device and an injection device for injecting a molten material into the die set clamped by the clamping device.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

An injection molding machine with a clamping device according to a first embodiment of the present invention will now be described with reference to FIGS. 1 to 3.

Figure 1:
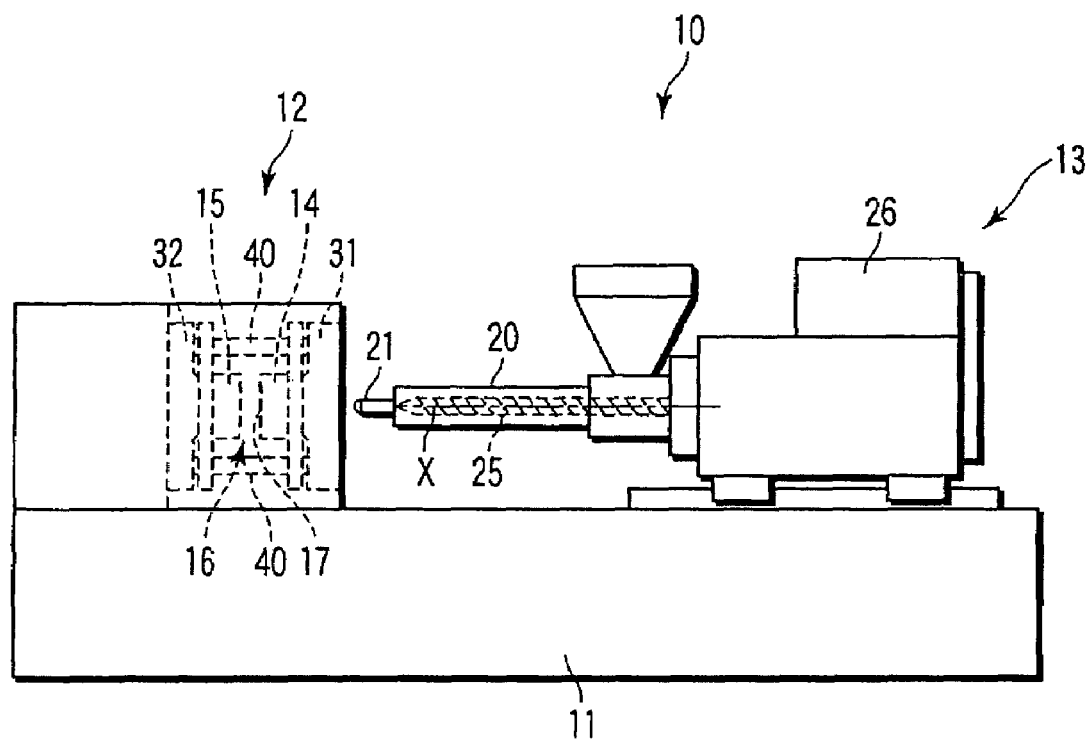
FIG. 1 is a side view of an injection molding machine provided with a clamping device according to a first embodiment of the invention.

FIG. 1 shows an example of an injection molding machine 10. The molding machine 10 is provided with a frame 11 as a cradle, a clamping device 12 which is placed on the frame 11, an injection device 13, etc. A die set 16 is disposed in the clamping device 12. The die set 16 is composed of a stationary die 14 and a movable die 15. Parting surfaces 17 are formed between the stationary die 14 and the movable die 15. The clamping device 12 will be described in detail later.

The injection device 13 is provided with a heating barrel 20. A nozzle 21 is provided on the distal end portion of the heating barrel 20. The nozzle 21 faces a material inlet 22 (shown in FIG. 2) that is formed in the stationary die 14. The heating barrel 20 can be moved in the direction of an axis X by a nozzle touch mechanism (not shown). The nozzle touch mechanism is composed of, for example, a cylinder mechanism or a mechanism that is formed of a ball screw and a motor. When the heating barrel 20 advances to a predetermined position, the distal end of the nozzle 21 abuts the material inlet 22 of the stationary die 14.

The heating barrel 20 contains a screw 25 therein. The screw 25 is rotatable with respect to the barrel 20 and movable in the direction of the axis X. The screw 25 can be rotated around the axis X by a screw drive mechanism 26. The screw drive mechanism 26 is provided with a drive source, such as a motor.

Figure 2:
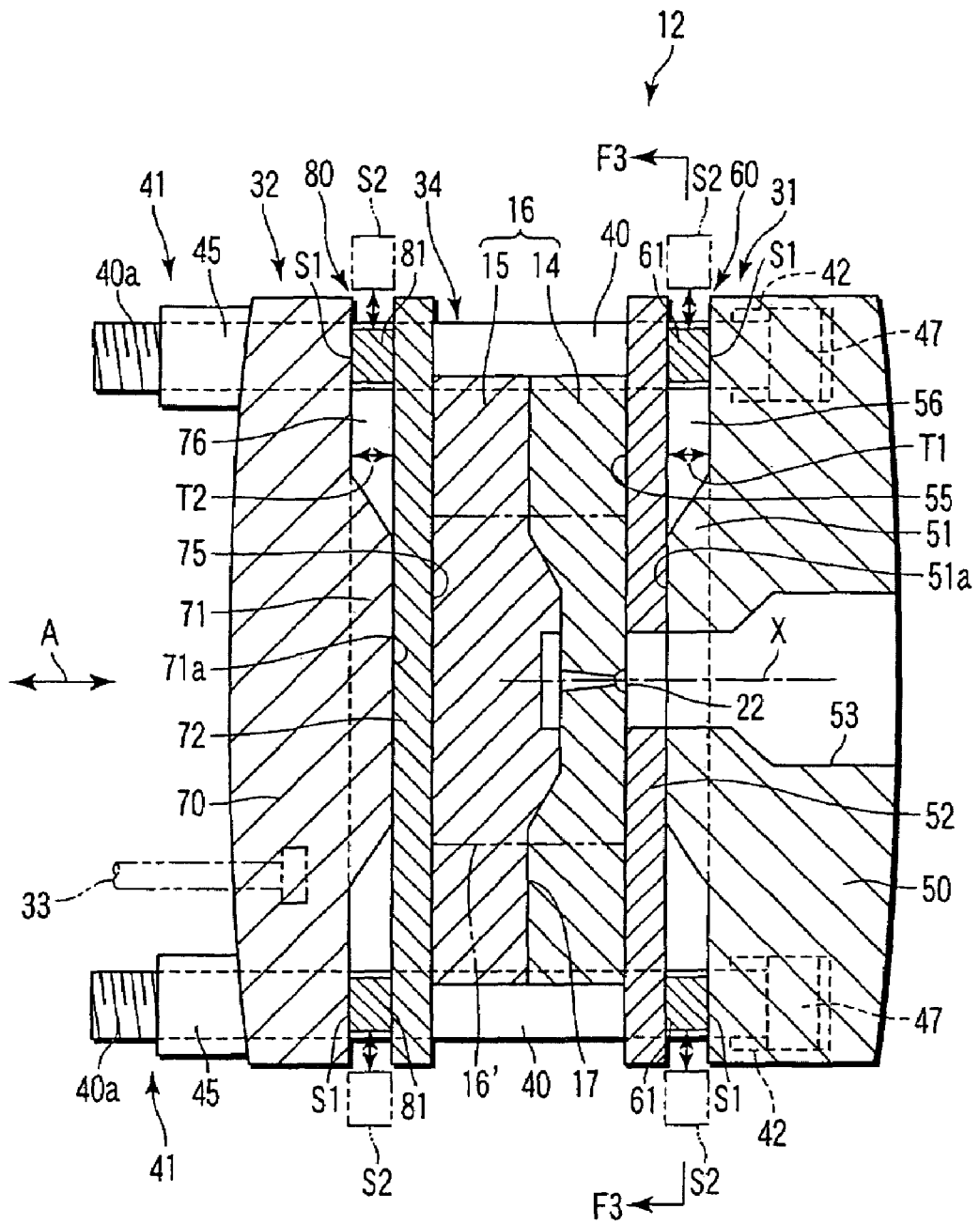
FIG. 2 is a sectional view of the clamping device of the injection molding machine shown in FIG. 1.
Figure 3:
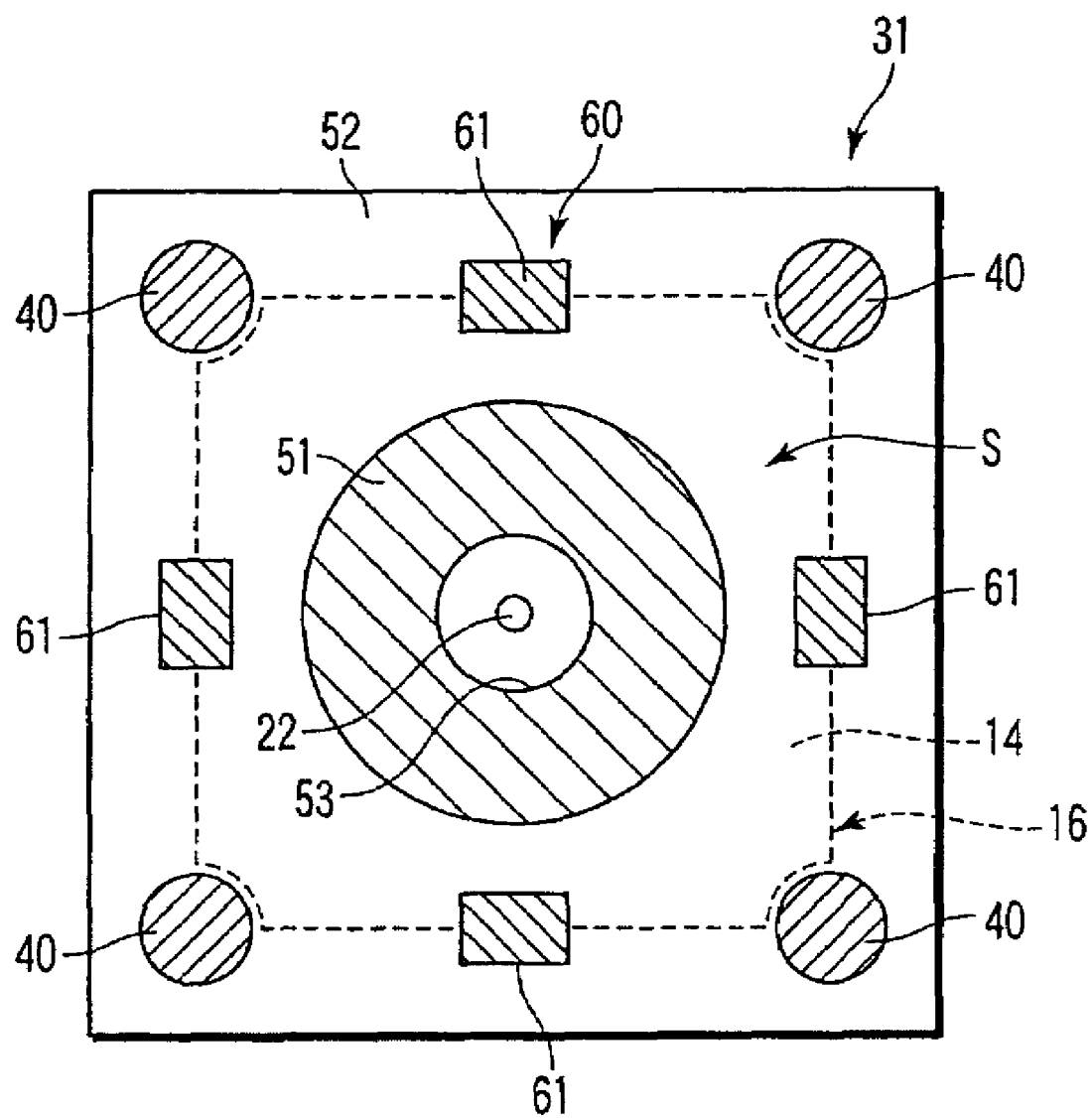
FIG. 3 is a sectional view of the clamping device taken along line F3-F3 of FIG. 2.

FIGS. 2 and 3 show a part of the composite clamping device 12 according to the present embodiment. The following is a description of the clamping device 12.

The clamping device 12 shown in FIG. 2 is provided with a stationary platen unit 31, a movable platen unit 32, a platen moving mechanism 33 (only a part of which is shown in FIG. 2), and a pressure mechanism 34. The stationary die 14 is attached to the stationary platen unit 31. The movable die 15 is attached to the movable platen unit 32. The platen moving mechanism 33 moves the movable platen unit 32 in the direction indicated by arrow A. The pressure mechanism 34 presses the movable platen unit 32 toward the stationary platen unit 31. The platen moving mechanism 33 is provided with an actuator, such as a hydraulic cylinder or a ball screw mechanism. The platen moving mechanism 33 can reciprocate the movable platen unit 32 at relatively long strokes in the direction of arrow A.

The pressure mechanism 34 includes four parallel tie bars 40, tie bar locking units 41, clamping cylinders 42, etc. The clamping cylinders 42 generate a tensile force in the tie bars 40. Each tie bar locking unit 41 includes a locking member 45 of a split-nut type. The locking member 45 can be divided in a diametric direction. The locking member 45 is driven between a fixed position and an unlocked position by an actuator (not shown). In the fixed position, the locking member 45 is in mesh with an engaged portion 40a of each tie bar 40. In the unlocked position, the locking member 45 is separate from the engaged portion 40a of the tie bar 40. A piston 47 of each clamping cylinder 42 is provided on an end portion of each tie bar 40.

As shown in FIG. 2, the stationary platen unit 31 includes a platen body 50, a load transmission portion 51, and a die fixing plate 52. The platen body 50 and the die fixing plate 52 are coupled to each other by a bolt (not shown). The platen body 50 and the load transmission portion 51 of the present embodiment are formed integrally with each other. However, the platen body 50 and the load transmission portion 51 may be separate from each other. A nozzle insertion portion 53 is formed in the platen body 50 and the load transmission portion 51. The platen body 50 is coupled to the clamping cylinders 42 of the pressure mechanism 34.

As shown in FIG. 3, the load transmission portion 51 is formed in a central part of a region S that is surrounded by the four tie bars 40. The load transmission portion 51 is in the form of a circular disc having a pressure surface 51a. The pressure surface 51a protrudes from a central part of the platen body 50 toward the die set 16. The area of the load transmission portion 51, that is, the area of the pressure surface 51a as viewed in the direction of the axis X in FIG. 2, is smaller than that of the platen body 50 as viewed in the direction of the axis X.

The die fixing plate 52 is located overlapping the pressure surface 51a of the load transmission portion 51. A die fixing surface 55 is formed on the die fixing plate 52. The stationary die 14 is attached to the die fixing surface 55. The area of the die fixing surface 55 is larger than that of the pressure surface 51a of the load transmission portion 51.

A space portion 56 is formed between the platen body 50 and the die fixing plate 52 so as to surround the load transmission portion 51. A support mechanism 60 is located in the space portion 56.

The support mechanism 60 restrains the outer peripheral portion of the die fixing plate 52 from bending toward the platen body 50. Further, the support mechanism 60 serves to transmit a part of a clamping force that acts on the platen body 50 to the outer peripheral portion of the die fixing plate 52.

The support mechanism 60 includes backup members 61. The backup members 61 are formed of high-stiffness metal blocks that cannot be easily deformed by a compression load. A thickness T1 of each backup member 61 is equal to the thickness of the load transmission portion 51. As shown in FIG. 3, the backup members 61 are situated near the outer peripheral portion of the die fixing plate 52. Each backup member 61 is located between each two adjacent tie bars 40.

As shown in FIG. 2, the movable platen unit 32 includes a platen body 70, a load transmission portion 71, and a die fixing plate 72. The platen body 70 and the die fixing plate 72 are coupled to each other by a bolt (not shown). The platen body 70 and the load transmission portion 71 of the present embodiment are formed integrally with each other. However, the platen body 70 and the load transmission portion 71 may be separate from each other. The tie bar locking unit 41 of the pressure mechanism 34 is coupled to the platen body 70.

The load transmission portion 71, like the load transmission portion 51 of the stationary platen unit 31, is formed in a central part of a region that is surrounded by the four tie bars 40. The load transmission portion 71 is in the form of a circular disc having a pressure surface 71a. The pressure surface 71a protrudes from a central part of the platen body 70 toward the die set 16. The area of the load transmission portion 71, that is, the area of the pressure surface 71a as viewed in the direction of the axis X in FIG. 2, is smaller than that of the platen body 70 as viewed in the direction of the axis X.

The die fixing plate 72 is located overlapping the pressure surface 71a of the load transmission portion 71. A die fixing surface 75 is formed on the die fixing plate 72. The movable die 15 is attached to the die fixing surface 75. The area of the die fixing surface 75 is larger than that of the pressure surface 71a of the load transmission portion 71.

A space portion 76 is formed between the platen body 70 and the die fixing plate 72 so as to surround the load transmission portion 71. A support mechanism 80 is located in the space portion 76.

The support mechanism 80 restrains the outer peripheral portion of the die fixing plate 72 from bending toward the platen body 70. Further, the support mechanism 80 serves to transmit a part of the clamping force that acts on the platen body 70 to the outer peripheral portion of the die fixing plate 72.

The support mechanism 80 includes backup members 81 that are similar to those of the support mechanism 60 of the stationary platen unit 31. A thickness T2 of each backup member 81 is equal to the thickness of the load transmission portion 71. These backup members 81, like the backup members 61 shown in FIG. 3, are situated near the outer peripheral portion of the die fixing plate 72.

The backup members 61 and 81 are movable between a first position S1 indicated by solid lines in FIG. 2 and a second position S2 indicated by two-dot chain lines. When the backup members 61 and 81 are in the first position S1, they are in contact with their corresponding platen bodies 50 and 70 and die fixing plates 52 and 72. When the backup members 61 and 81 are in the second position S2, they are separate from their corresponding bodies 50 and 70 and die fixing plates 52 and 72.

The parting surfaces 17 of the large die set 16 shown in FIG. 2 are wider than the respective pressure surfaces 51a and 71a of the load transmission portions 51 and 71. When the die set 16 is attached to the die fixing plates 52 and 72, the backup members 61 and 81 are located in the first position S1. When a die set 16' that is smaller than the die set 16 is attached to the die fixing plates 52 and 72, the backup members 61 and 81 are moved to the second position S2.

The following is a description of the operation of the injection molding machine 10 of the present embodiment (FIGS. 1 to 3).

If the respective engaged portions 40a of the tie bars 40 are not restricted by the locking members 45 when the tie bar locking units 41 are unlocked, the movable platen unit 32 can move in the direction indicated by arrow A in FIG. 2.

The movable platen unit 32 is moved toward the stationary platen unit 31 by the platen moving mechanism 33. The respective parting surfaces 17 of the stationary and movable dies 14 and 15 are in contact with each other. In this state, the respective engaged portions 40a of the tie bars 40 are restricted by the locking members 45 of the tie bar locking unit 41.

A tension is generated in the tie bars 40 by introducing an oil hydraulic pressure into the clamping cylinders 42 to drive the pistons 47 in a clamping direction. Thereupon, the movable platen unit 32 is pressed toward the stationary platen unit 31. By this clamping operation, the respective parting surfaces 17 of the stationary and movable dies 14 and 15 are brought firmly into close contact with each other.

The pressure receiving area (areas of contact between the dies 14 and 15 and the plates 52 and 72) of the large die set 16 shown in FIG. 2 is considerably larger than the areas of the respective pressure surfaces 51a and 71a of the load transmission portions 51 and 71. If central parts of the die fixing plates 52 and 72 are pressed by the transmission portions 51 and 71, therefore, the outer peripheral portions of the plates 52 and 72 are urged to be deformed away from each other.

According to the present embodiment, however, the backup members 61 and 81 are located between the platen bodies 50 and 70 and the respective outer peripheral portions of the die fixing plates 52 and 72. Therefore, the outer peripheral portions of the die fixing plates 52 and 72 can be restrained from bending toward the platen bodies 50 and 70, respectively. Thus, a leakage of a material and formation of burrs can be prevented from being caused as the parting surfaces 17 near the respective outer peripheral portions of the stationary and movable dies 14 and 15 leave each other.

The stationary and movable platen units 31 and 32 of the present embodiment are composed of the platen bodies 50 and 70 and the die fixing plates 52 and 72, respectively. Thus, both the stationary and movable platen units 31 and 32 of the present embodiment have a double-plate structure. Even if the clamping force from the platen bodies 50 and 70 is transmitted to the die set 16 through the load transmission portions 51 and 71 and the die fixing plates 52 and 72, therefore, the parting surfaces 17 near the center of the die set 16 can be prevented from opening. The thicknesses and sizes of the backup members 61 and 81 may be changed depending on the die dimensions and the magnitude of the clamping force. Although a substantial pressure is generated in the die set 16 during the injection molding operation, the die set 16 can be retained by means of the load transmission portions 51 and 71 and the backup members 61 and 81. In consequence, a failure can be prevented such that the parting surfaces 17 open at the outer peripheral portion of the die set 16.

Thus, according to the present embodiment, the die set 16 can be clamped in a desirable state without increasing the thicknesses and stiffness of the platen bodies 50 and 70 and the die fixing plates 52 and 72. Therefore, injection-molded products can avoid suffering burrs. Since the platen bodies 50 and 70 and the die fixing plates 52 and 72 need not be increased in thickness, moreover, the clamping device 12 can be reduced in weight and improved in compactness.

Although the composite clamping device 12 has been described according to the present embodiment, the present invention is also applicable to a toggle-type clamping device. The toggle-type clamping device includes four tie bars and a toggle mechanism that generates a clamping force in the tie bars. If a tension is generated in the tie bars with the toggle mechanism stretched, a movable platen is pressed toward a stationary platen.

When a small die set 16' is attached to the die fixing plates 52 and 72, the backup members 61 and 81 are moved to the second position S2. When the small die set 16' is used, therefore, a clamping force from the pressure mechanism 34 can be prevented from acting on the respective outer peripheral portions of the die fixing plates 52 and 72. Thus, the failure of the conventional clamping device shown in FIG. 9 can be prevented.

Figure 4:
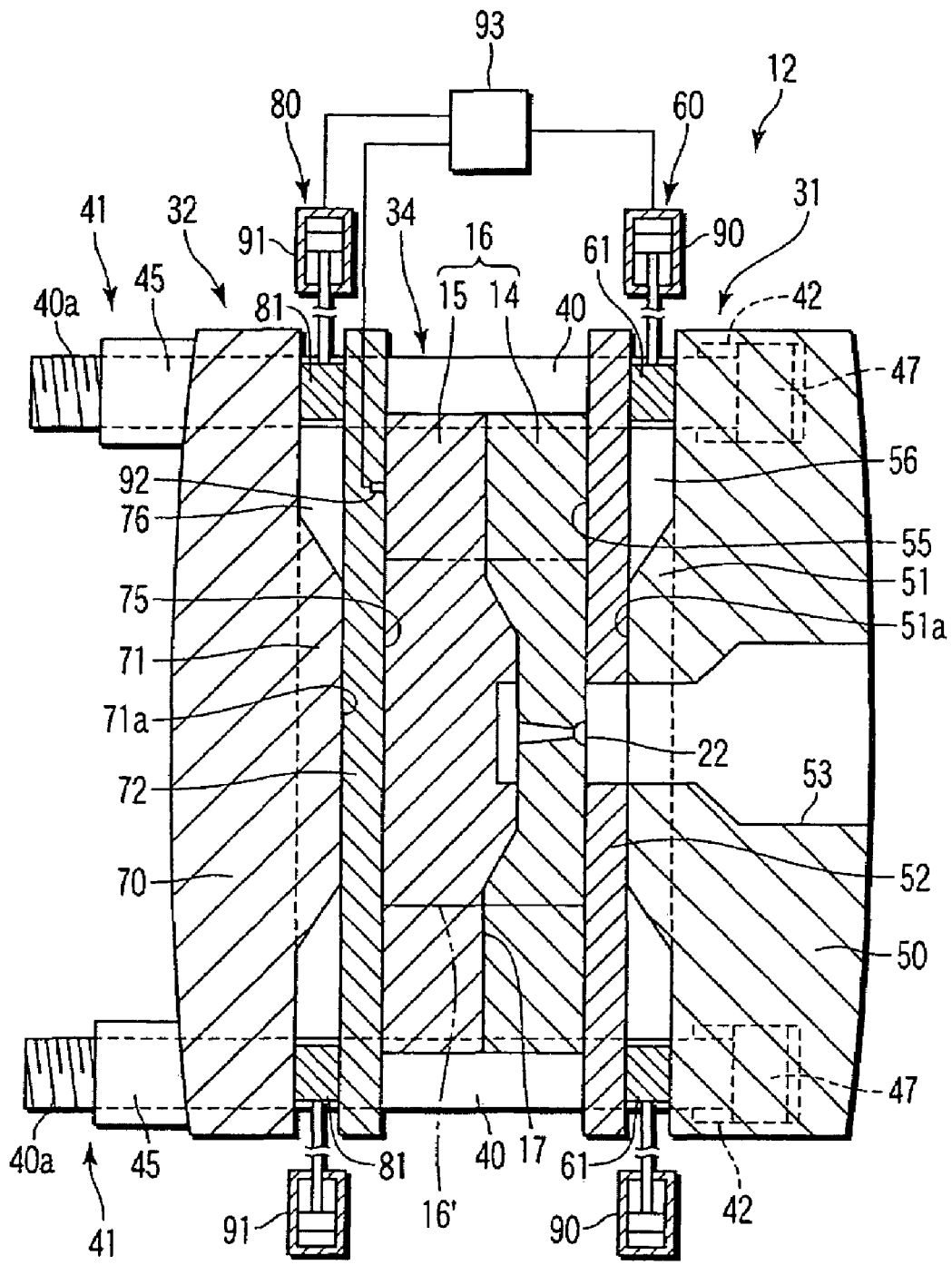
FIG. 4 is a sectional view of a clamping device according to a second embodiment of the invention.

FIG. 4 shows a second embodiment of the present invention. Support mechanisms 60 and 80 of this second embodiment are configured so that backup members 61 and 81 can be loaded and unloaded through the side of platen bodies 50 and 70. These backup members 61 and 81 are loaded and unloaded through the side of the platen bodies 50 and 70 by actuators 90 and 91. The actuators 90 and 91 are fluid-pressure cylinders, such as hydraulic cylinders for example. The fluid-pressure cylinders may be replaced with electromagnetic actuators, each formed of a ball screw and a motor, or solenoids.

A sensor 92 may be provided for determining whether a die set that is attached to die fixing plates 52 and 72 is a large die set 16 or a small die set 16'. A die detection signal output from the sensor 92 is input to a controller 93. When the large die set 16 is attached to the die fixing plates 52 and 72, the controller 93 controls the actuators 90 and 91 to move the backup members 61 and 81 to the first position S1. When the small die set 16' is attached to the die fixing plates 52 and 72, the controller 93 controls the actuators 90 and 91 to move the backup members 61 and 81 to the second position S2.

In the case of this embodiment (FIG. 4), parting surfaces 17 at the outer peripheral portion of the die set 16 can be restrained from opening by moving the backup members 61 and 81 to the first or second position, depending on the die dimensions and the magnitude of the clamping force. Since other configurations and operations are the same as those of the clamping device 12 of the first embodiment, common numerals are used to designate like portions, and a description of those portions is omitted.

Figure 5:
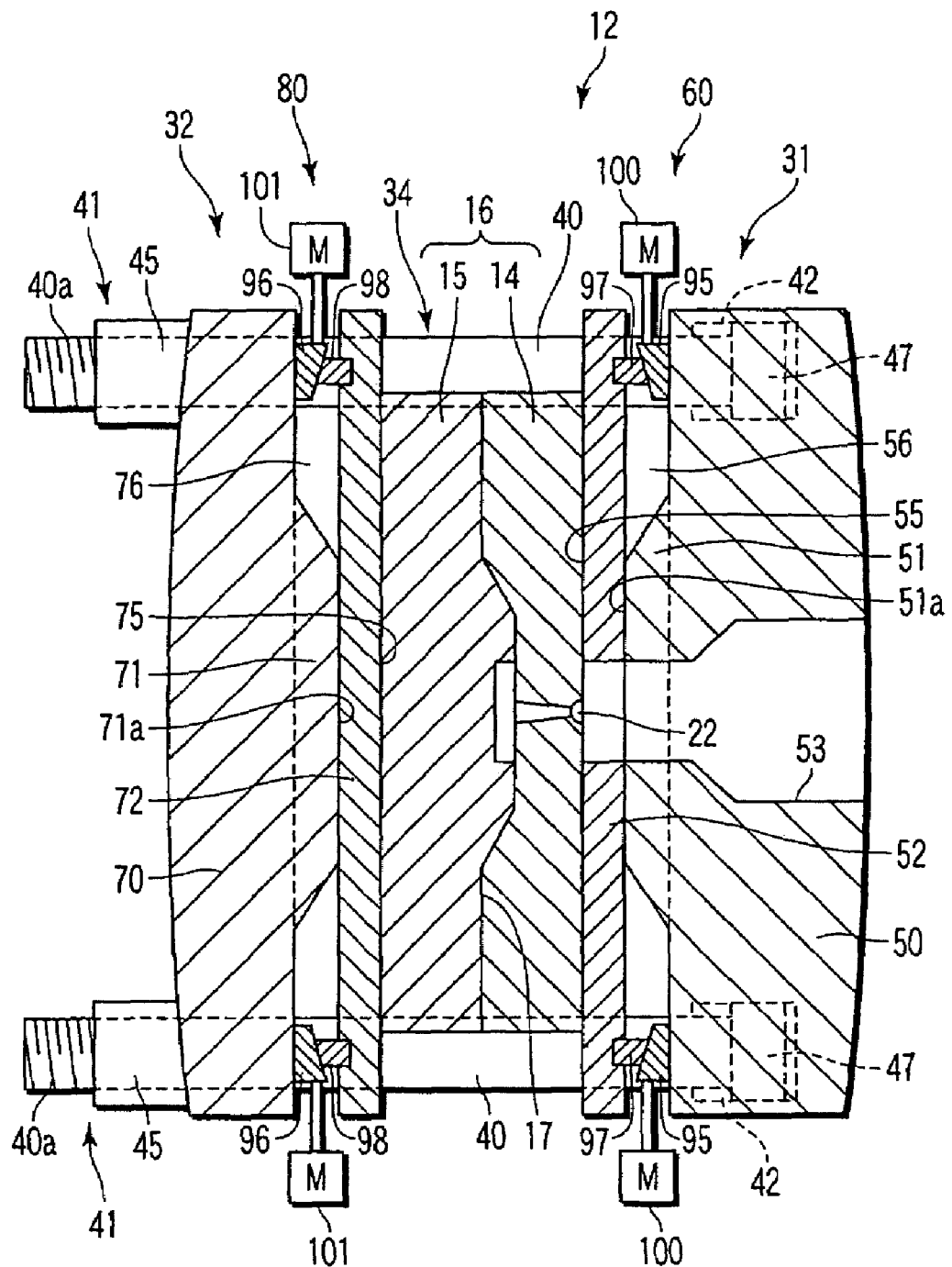
FIG. 5 is a sectional view of a clamping device according to a third embodiment of the invention.

FIG. 5 shows a third embodiment of the invention. Support mechanisms 60 and 80 of this embodiment are provided with wedge-shaped backup members 95 and 96, receiving members 97 and 98, and actuators 100 and 101. The backup members 95 and 96 are movable parallel to die fixing surfaces 55 and 75. The receiving members 97 and 98 have slopes that are in contact with the backup members 95 and 96, respectively. The backup members 95 and 96 can be moved parallel to the die fixing surfaces 55 and 75 by the actuators 100 and 101.

The actuators 100 and 101, which are each composed of, for example, a ball screw and a stepping motor, can move the backup members 95 and 96 to desired positions. According to this embodiment (FIG. 5), parting surfaces 17 at the outer peripheral portion of a die set 16 can be restrained from opening by moving the wedge-shaped backup members 95 and 96, depending on the die dimensions and the magnitude of the clamping force. Since other configurations and operations are the same as those of the clamping device 12 of the first embodiment, common numerals are used to designate like portions, and a description of those portions is omitted.

Figure 6:
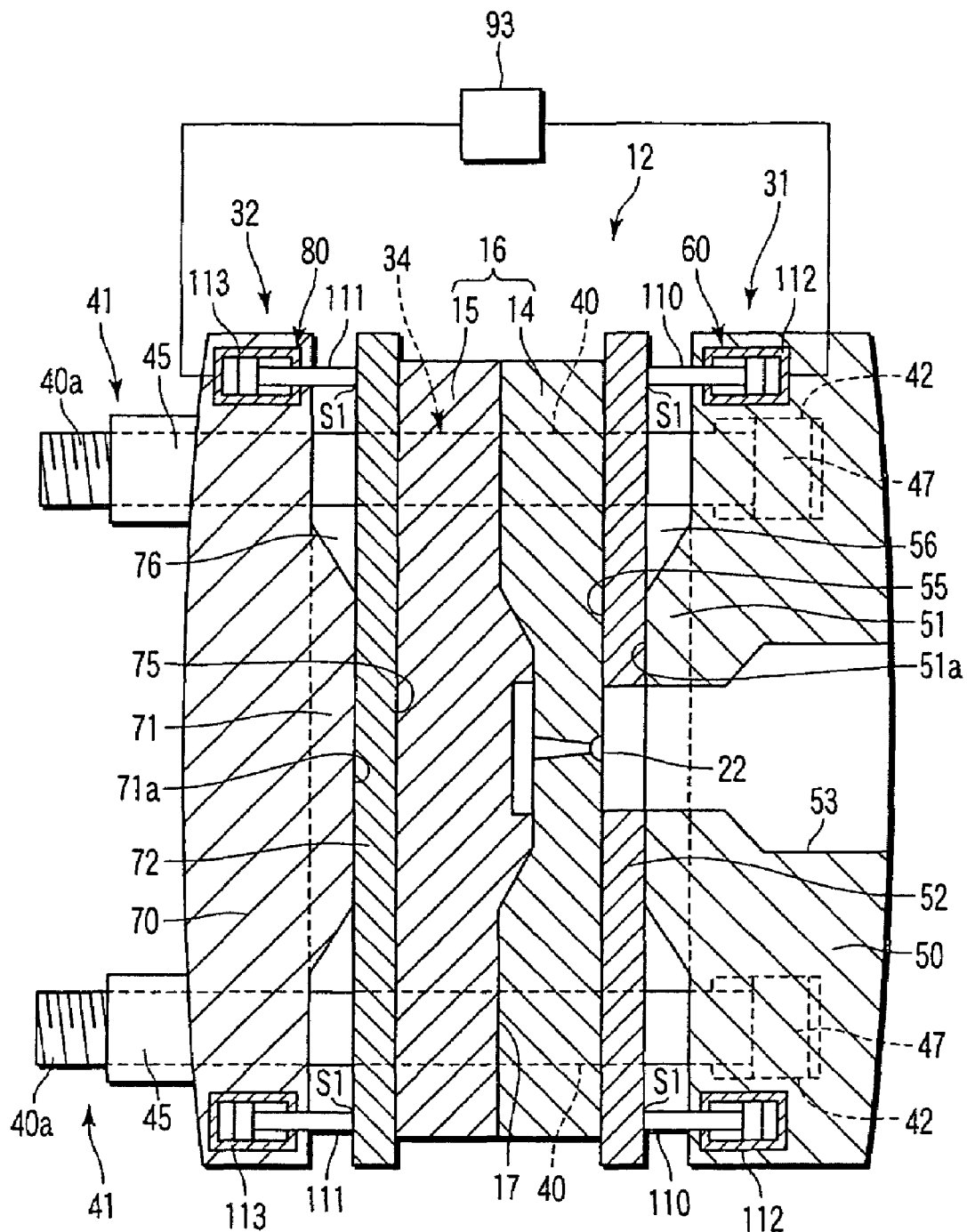
FIG. 6 is a sectional view of a clamping device according to a fourth embodiment of the invention.

FIG. 6 shows a fourth embodiment of the invention. Support mechanisms 60 and 80 of this embodiment are provided with backup members 110 and 111 and actuators 112 and 113. The backup members 110 and 111 are movable at right angles to die fixing surfaces 55 and 75. The actuators 112 and 113 can move the backup members 110 and 111. The actuators 112 and 113 are disposed in platen bodies 50 and 70, respectively. Although the actuators 112 and 113 are hydraulic cylinders, by way of example, they may be replaced with electromagnetic actuators, each formed of a ball screw and a motor, for example.

When a large die set 16 is attached to die fixing plates 52 and 72, as shown in FIG. 6, the backup members 110 and 111 move to the first position S1. The respective distal ends of the backup members 110 and 111 abut the die fixing plates 52 and 72. The actuators 112 and 113 may be controlled by a controller 93 similar to that of the embodiment shown in FIG. 4.

Also in this embodiment (FIG. 6), a clamping force that acts on the platen bodies 50 and 70 is transmitted to the die set 16 through load transmission portions 51 and 71 and the die fixing plates 52 and 72. Therefore, parting surfaces 17 are prevented from opening in the vicinity of the center of the die set 16. Since the backup members 110 and 111 are situated in the first position S1, the respective outer peripheral portions of the die fixing plates 52 and 72 are restrained from being deformed by the clamping force. Further, the outer peripheral portions of the plates 52 and 72 are pressed toward the die set 16 by the backup members 110 and 111, respectively. For these reasons, the parting surfaces 17 can be restrained from being opened at the outer peripheral portion of the die set 16 by the internal pressure of the die set.

According to this embodiment (FIG. 6), a hydraulic force for the actuators 112 and 113 is adjusted depending on molding conditions. Thus, various molding conditions can be coped with. Further, the amount of projection of the backup members 110 and 111 are adjusted in accordance with the die dimensions and the magnitude of the clamping force. Thus, the respective outer peripheral portions of the die fixing plates 52 and 72 can be more accurately restrained from being deformed. Since other configurations and operations are the same as those of the clamping device 12 of the third embodiment shown in FIG. 5, a description thereof is omitted.

Figure 7:
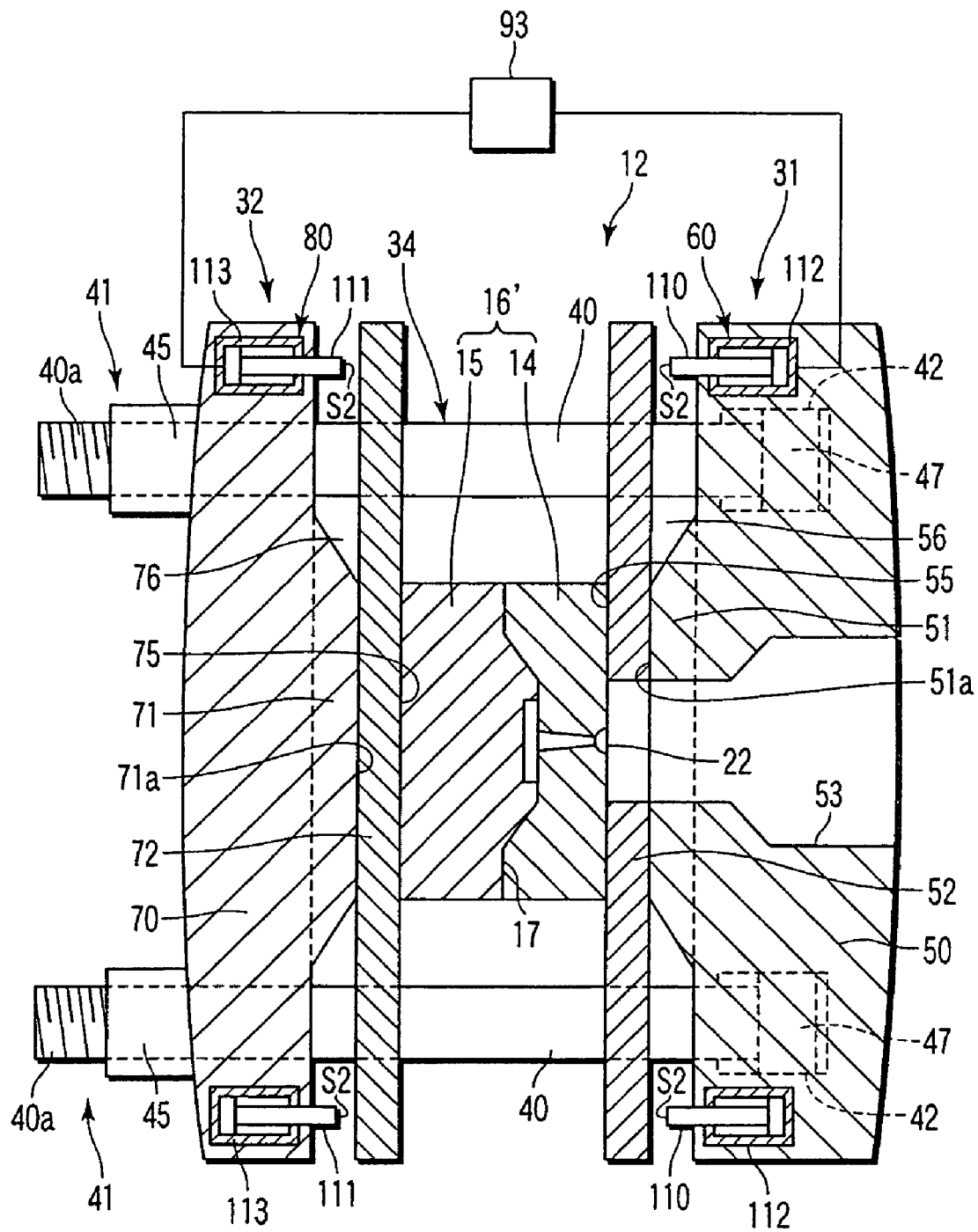
FIG. 7 is a sectional view showing a state in which a small die set is attached to the clamping device shown in FIG. 6.

FIG. 7 shows an example in which a small die set 16' is attached to the clamping device 12. When the small die set 16' is attached to the die fixing plates 52 and 72, the backup members 110 and 111 move to the second position S2. Therefore, the respective distal ends of the backup members 110 and 111 leave the plates 52 and 72. The clamping force that acts on the platen bodies 50 and 70 is transmitted from the load transmission portions 51 and 71 to the die set 16 through the die fixing plates 52 and 72.

Figure 9:
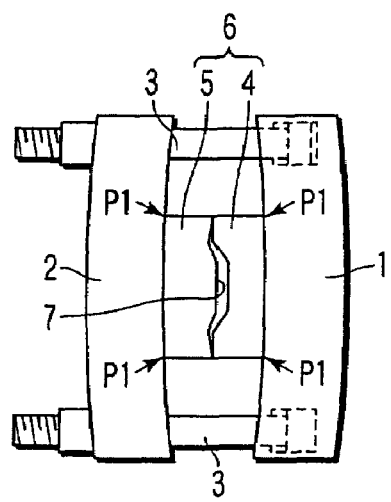
FIG. 9 is side view showing a conventional clamping device.
Figure 10:
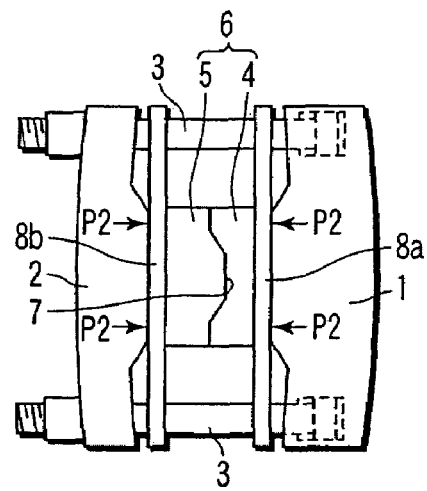
FIG. 10 is a side view schematically showing a state in which a small die set is clamped by a clamping device including a conventional die fixing plate.
Figure 11:
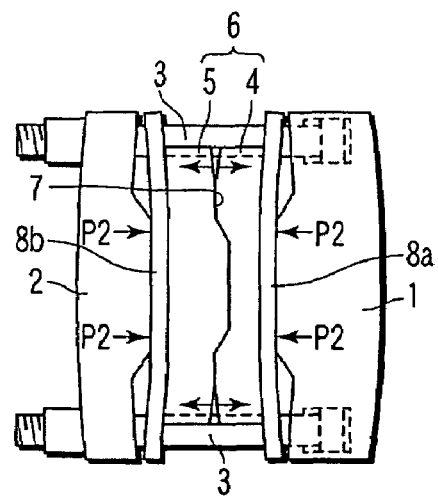
FIG. 11 is a side view schematically showing a state in which a large die set is clamped by the clamping device including the conventional die fixing plate.

If the die fixing plates 52 and 72 are not provided, the platens inevitably bend in the same manner as those of the conventional clamping device shown in FIG. 9, and the material that is injected into the die set may possibly leak through the parting surfaces 17 of the die set. In the clamping device 12 of the present embodiment (FIG. 7), however, the die fixing plates 52 and 72 are located between the die set 16' and the platen bodies 50 and 70. Besides, the backup members 110 and 111 are situated in the second position S2, and the respective distal ends of the backup members 110 and 111 are separate from the die fixing plates 52 and 72. Thus, the parting surfaces 17 of even the small die set 16' can be prevented from opening.

Figure 8:
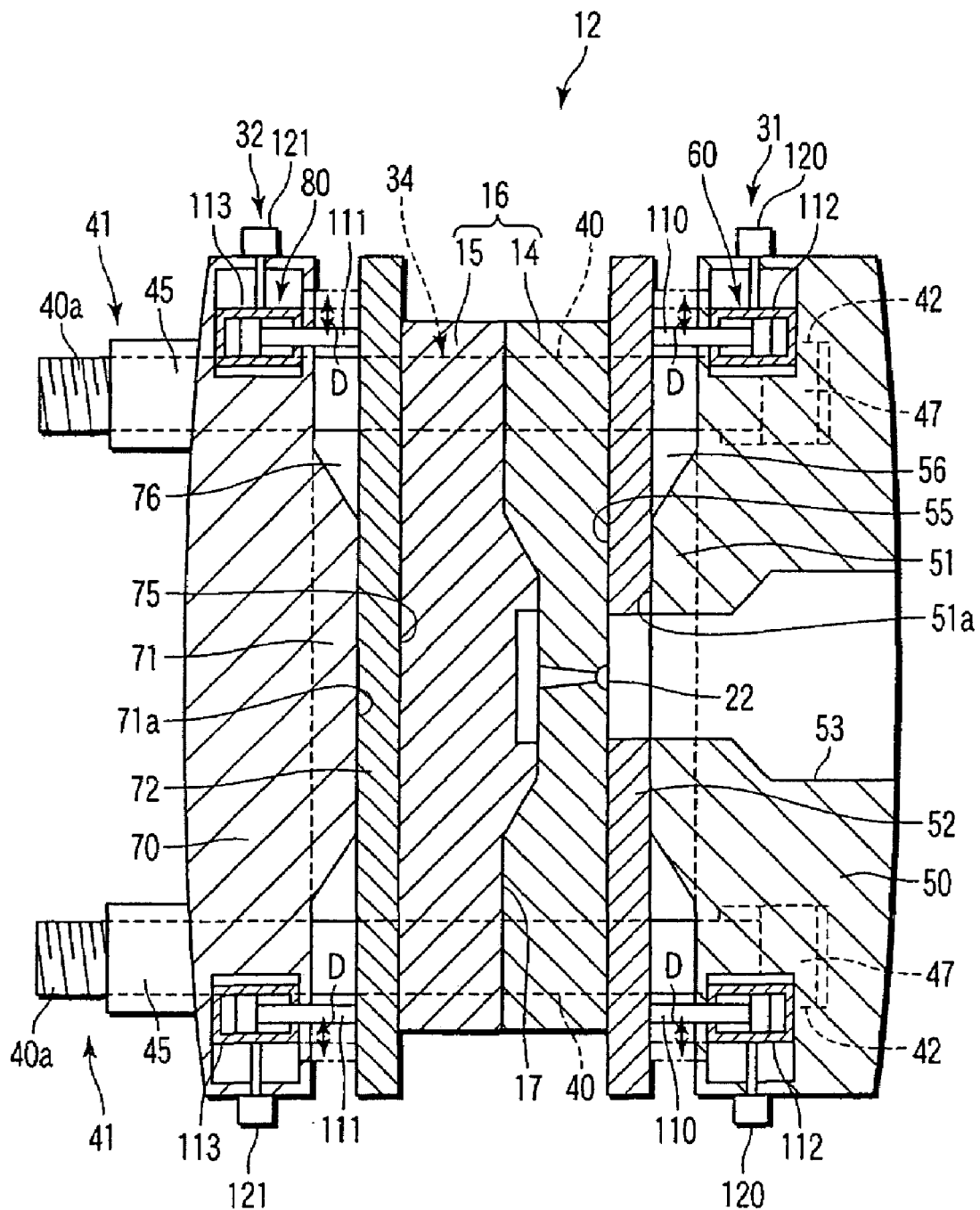
FIG. 8 is a sectional view of a clamping device according to a fifth embodiment of the invention.

FIG. 8 shows a fifth embodiment of the invention. Support mechanisms 60 and 80 of this embodiment are movable parallel to die fixing surfaces 55 and 75 (in the direction indicated by arrow D). The support mechanisms 60 and 80 are disposed in the platen bodies 50 and 70, respectively. The support mechanisms 60 and 80 can be moved in the direction indicated by arrow D by moving mechanisms 120 and 121, respectively. The moving mechanisms 120 and 121 may, for example, be ball screw mechanisms, fluid cylinder mechanisms, or feed screw mechanisms that are operated manually.

In the case of this embodiment (FIG. 8), the support mechanisms 60 and 80 are moved parallel to the die fixing surfaces 55 and 75, depending on the die dimensions and clamping conditions. Thus, the respective outer peripheral portions of die fixing plates 52 and 72 can be restrained more effectively from being deformed during clamping operation. Since other configurations and operations are the same as those of the clamping device 12 shown in FIG. 6, common numerals are used to designate like portions, and a description of those portions is omitted.

In each of the embodiments described above, each of the stationary and movable platen units is provided with the platen body, load transmission portion, die fixing plate, and support mechanism. Alternatively, however, the clamping device may be configured so that only one of the two platen units is provided with the platen body, load transmission portion, die fixing plate, and support mechanism.

In each of the foregoing embodiments, the platen bodies are integral with the load transmission portions. Alternatively, however, the platen bodies may be separate from the load transmission portions. Further, the load transmission portions and the die fixing plates may be integral with one another. Furthermore, the platen bodies, load transmission portions, and die fixing plates may be integral with one another.

It is to be understood, in carrying out the present invention including the embodiments described herein, that the components of the invention, including the pressure mechanism, the support mechanism with the backup members, etc., as well as the platen units, may be suitably modified.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A clamping device for selectively clamping a first die set or a second die set, each die set including a stationary die, a movable die, and parting surfaces formed between the dies, the clamping device comprising:

a stationary platen unit to which the stationary die of the first die set or the stationary die of the second die set is attached;

a movable platen unit to which the movable die of the first die set or the movable die of the second die set is attached;

a plurality of tie bars stretched between the stationary platen unit and the movable platen unit and arranged parallel to one another at respective outer peripheral portions of the platen units; and a pressure mechanism which presses the stationary platen unit and the movable platen unit toward each other, at least one of the stationary and movable platen units including a platen body configured to be pressed by the pressure mechanism, a load transmission portion having a pressure surface projecting toward the die set from a central part of a platen body region which is surrounded by the tie bars, a die fixing plate located on the pressure surface and having a die fixing surface wider than the load transmission portion, a space portion formed around the load transmission portion and between the platen body and the die fixing plate, and a backup member disposed in the space portion between the platen body and the die fixing plate, the backup member being configured to move between a first position in which the backup member is in contact with both the platen body and the die fixing plate and a second position in which the backup member is separate from the platen body or the die fixing plate, and the backup member being situated in the first position when the first die set with the parting surfaces wider than the pressure surface is attached to the die fixing plate and being moved to the second position when the second die set smaller than the first die set is attached to the die fixing plate.

2. A clamping device according to claim 1, which further comprises an actuator for loading and unloading the backup member through the side of the platen body.

3. A clamping device according to claim 2, which further comprises a controller which controls the actuator to move the backup member between the first position and the second position.

4. A clamping device according to claim 3, which further comprises a sensor for determining whether the die set attached to the die fixing plate is the first die set or the second die set.

5. A clamping device according to claim 1, wherein the backup member is a wedge-shaped backup member movable parallel to the die fixing surface, and which further comprises an actuator for moving the backup member parallel to the die fixing surface.

6. A clamping device according to claim 1, wherein the backup member is movable at right angles to the die fixing surface, and which further comprises an actuator for moving the backup member at right angles to the die fixing surface.

7. A clamping device according to claim 6, wherein the backup member and the actuator are disposed for movement parallel to the die fixing surface.

8. A clamping device according to claim 7, which further comprises a moving mechanism for moving the backup member and the actuator parallel to the die fixing surface.

9. An injection molding machine comprising the clamping device according to claim 1 and an injection device for injecting a molten material into the die set clamped by the clamping device.

10. A clamping device for clamping a die set which includes a stationary die, a movable die, and parting surfaces formed between the dies, comprising:
   a stationary platen unit to which the stationary die is attached;
   a movable platen unit to which the movable die is attached;
   a plurality of tie bars stretched between the stationary platen unit and the movable platen unit and arranged parallel to one another at respective outer peripheral portions of the platen units; and
   a pressure mechanism which presses the stationary platen unit and the movable platen unit toward each other,
   at least one of the stationary and movable platen units including
      a platen body configured to be pressed by the pressure mechanism,
      a load transmission portion having a pressure surface projecting toward the die set from a central part of a platen body region which is surrounded by the tie bars,
      a die fixing plate located on the pressure surface and having a die fixing surface wider than the load transmission portion,
      a space portion formed around the load transmission portion and between the platen body and the die fixing plate,
      a backup member disposed in the space portion between the platen body and the die fixing plate, the backup member being configured to move between a first position in which the backup member is in contact with both the platen body and the die fixing plate and a second position in which the backup member is separate from the platen body and/or the die fixing plate, the backup member being adapted to be situated in the first position when a first die set with the parting surfaces wider than the pressure surface is attached to the die fixing plate, and to be moved to the second position when a second die set with the parting surfaces narrower than the pressure surface is attached to the die fixing plate,
      an actuator for loading and unloading the backup member through a side of the platen body,
      a sensor for determining whether the die set attached to the die fixing plate is the first die set or the second die set, and
      a controller which controls the actuator to move the backup member between the first position and the second position in response to the determination by the sensor of whether the die set attached to the die fixing plate is the first die set or the second die set.

11. A clamping device for clamping a die set which includes a stationary die, a movable die, and parting surfaces formed between the dies, comprising:
   a stationary platen unit to which the stationary die is attached;
   a movable platen unit to which the movable die is attached;
   a plurality of tie bars stretched between the stationary platen unit and the movable platen unit and arranged parallel to one another at respective outer peripheral portions of the platen units; and
   a pressure mechanism which presses the stationary platen unit and the movable platen unit toward each other,
   at least one of the stationary and movable platen units including
      a platen body configured to be pressed by the pressure mechanism,
      a load transmission portion having a pressure surface projecting toward the die set from a central part of a platen body region which is surrounded by the tie bars,
      a die fixing plate located on the pressure surface and having a die fixing surface wider than the load transmission portion,
      a space portion formed around the load transmission portion and between the platen body and the die fixing plate, and
      a backup member disposed in the space portion between the platen body and the die fixing plate, the backup member being movable at right angles to the die fixing surface, and
      an actuator for moving the backup member at right angles to the die fixing surface,
      the backup member being configured to move between a first position in which the backup member is in contact with both the platen body and the die fixing plate and a second position in which the backup member is separate from the platen body and/or the die fixing plate,
      the backup member being adapted to be situated in the first position when a first die set with the parting surfaces wider than the pressure surface is attached to the die fixing plate, and to be moved to the second position when a second die set with the parting surfaces narrower than the pressure surface is attached to the die fixing plate.

12. A clamping device according to claim 11, wherein the backup member and the actuator are disposed for movement parallel to the die fixing surface.

13. A clamping device according to claim 12, which fiarther comprises a moving mechanism for moving the backup member and the actuator parallel to the die fixing surface.

* * * * *